United States Patent
Barham et al.

(10) Patent No.: US 7,296,083 B2
(45) Date of Patent: Nov. 13, 2007

(54) METHOD AND SYSTEM FOR MEASURING LOAD AND CAPACITY ON A VARIABLE CAPACITY CHANNEL

(75) Inventors: Paul Barham, Cambridge (GB); Richard Black, Cambridge (GB); Neil Stratford, Ely (GB)

(73) Assignee: Microsoft Corporation, Redmond, WA (US)

( * ) Notice: Subject to any disclaimer, the term of this patent is extended or adjusted under 35 U.S.C. 154(b) by 1108 days.

(21) Appl. No.: 10/187,043

(22) Filed: Jun. 28, 2002

(65) Prior Publication Data

US 2004/0003107 A1 Jan. 1, 2004

(51) Int. Cl.
*G06F 15/16* (2006.01)
(52) U.S. Cl. ............... 709/232; 709/233; 370/229; 370/230
(58) Field of Classification Search ........ 709/221, 709/224, 235, 232, 233; 370/231, 232, 229, 370/230
See application file for complete search history.

(56) References Cited

U.S. PATENT DOCUMENTS

| | | | | |
|---|---|---|---|---|
| 5,400,329 A | * | 3/1995 | Tokura et al. | 370/232 |
| 5,633,861 A | * | 5/1997 | Hanson et al. | 370/232 |
| 5,864,678 A | | 1/1999 | Riddle | |
| 5,878,224 A | * | 3/1999 | Smith | 709/224 |
| 5,987,493 A | * | 11/1999 | Rangan et al. | 709/224 |
| 6,009,473 A | * | 12/1999 | Lowe | 709/233 |
| 6,279,001 B1 | * | 8/2001 | DeBettencourt et al. | 709/221 |
| 6,614,763 B1 | * | 9/2003 | Kikuchi et al. | 370/252 |
| 2003/0097461 A1 | * | 5/2003 | Barham et al. | 709/235 |

OTHER PUBLICATIONS

Anonymous, Copy of International Search Report in Corresponding EP Application No. EP 03 00 9716 dated Jul. 30, 2003.
Lai, Kevin; Baker, Mary. "Measuring Link Bandwidths Using a Deterministic Model of Packet Delay." p. 283-294. XP-001059986, Oct. 2000.
"TCP Timeout and Retransmission." p. 297-304. XP-002108265, Oct. 1993.
Kamolphiwong, S.; Karbowiak, A.E.; Mehrpour, H. "Flow Control in ATM Networks: A Survey." *Department of Communications, School of Electrical Engineering, The University of New South Wales*, Sydney, NSW 2052, Australia. p. 951-968. Mar. 3, 1998. XP-004138768.

* cited by examiner

*Primary Examiner*—Phuoc Nguyen
(74) *Attorney, Agent, or Firm*—Workman Nydegger

(57) ABSTRACT

A method and system are presented for determining the loading and capacity on a variable capacity channel by measuring the times at which packets are enqueued for transmission, and have their transmission completed, or by measuring these times in addition to the arrival times of the packets. The times may be measured using a device driver or other operating system component. The measurement may be performed in a centralized or distributed fashion for multi-access or point to point channels.

9 Claims, 8 Drawing Sheets

METHOD AND SYSTEM FOR MEASURING LOAD AND CAPACITY ON A VARIABLE CAPACITY CHANNEL

FIELD OF THE INVENTION

The present invention is generally directed to computer systems and networks, and more particularly to measuring network congestion.

BACKGROUND OF THE INVENTION

Network congestion generally refers to overloading the resources of a network, such as routers and switches, with packets that need to be handled. When network congestion occurs, packets are dropped by an overloaded resource and have to be retransmitted. Numerous methods and proposals for avoiding network congestion are known, but each has its own drawbacks with respect to issues such as fairness, (e.g., which packets get dropped), enforcement, practical implementation difficulties, and so forth.

For example, in the Transmission Control Protocol (TCP), network congestion is controlled via various phases and techniques, including a congestion avoidance phase. TCP controls its transmit rate by a congestion window that determines the maximum amount of data that may be in transit at any time, wherein a congestion window's worth of data is transmitted every round-trip time. In the absence of congestion, TCP increases its congestion window by one packet each round-trip time. To avoid congestion, if the network drops any packet, TCP halves its congestion window. However, detecting congestion through packet loss, typically as a result of overflow in a router's output queue, has a number of drawbacks including that this method is reactive rather than proactive, as by the time the (often substantial) router buffers are filled up and packets start to get dropped, the network is seriously overloaded. Consequently, the "normal" operating state of the network is to have substantial queuing delays in each router. Moreover, only those flows whose packets are dropped are aware of the congestion, which is why TCP needs to back off aggressively and halve the congestion window. The dropped packets often are not from the source that initially caused the congestion.

A more proactive attempt to avoid network congestion based on the above reduce-on-dropped-packets scheme is "Random Early Detection" (RED). RED operates by randomly discarding more and more packets as the network gets more and more congested, whereby the various sources' TCP congestion avoidance mechanisms halve their congestion windows before full congestion occurs. Packets are discarded with a probability computed from many parameters and variables, including the smoothed length of the forwarding queue. This scheme also has its drawbacks, as among other things, packets are unnecessarily dropped before the network is actually full.

A proposed improvement to TCP/IP, known as Explicit Congestion Notification (ECN), would mark the packets (e.g., that would be dropped in RED) instead of actually dropping them. The mark is returned to the source, whereby the source may slow down its rate of transmission. More particularly, ECN would work to signal the onset of congestion by setting a single bit in the IP packet header. To aid incremental deployment in the Internet, ECN aware traffic flows would identify themselves by setting a further bit in the IP header, whereby non-aware flows could have their packets discarded as normal. When received, the destination (TCP sink) sends back these ECN bits to the source (e.g., in an acknowledgement packet, or ACK) as a TCP option, whereby the source reacts to the ECN signals in the same way as TCP reacts to lost packets, for instance, by halving the congestion window on receipt of such a signal.

As an alternative to the above models, theorists have suggested congestion pricing as a possible solution to network congestion problems. In essence, these congestion pricing theories suggest that each router in the network should charge all sources responsible for network congestion, (e.g., by an in-band marking of their packets). Then, in the acknowledgement from the destination or by some other means, each source is notified of the total congestion caused, such that sources will voluntarily reduce their transmit rates based on their "willingness to pay."

Various such network congestion pricing schemes have been designed and/or implemented. For example, U.S. patent application Ser. No. 10/010,881, filed Nov. 8, 2001, assigned to the assignee of the present invention and hereby incorporated by reference herein in its entirety, is directed to controlling network demand via congestion pricing, and describes a number of practical designs and/or implementations having many beneficial properties.

Such schemes for controlling (or indicating) levels of congestion typically require the measuring of the network load on the link or links in the network. Generally, measuring the load is accomplished by monitoring the packets being sent on the link relative to the capacity of the link.

However, this can be particularly problematic when the capacity of the link is variable rather than fixed, which may occur for a variety of reasons and in a variety of circumstances, both actual and effective. For example, compression can vary the effective capacity of a link, as the amount of compression achieved varies with the type of data being compressed. Another example is when additional physical links or transmission channels are added or removed depending on network usage, e.g., in a system that dials-up additional links as needed. Yet another example is wireless technology. Wireless technology is unable to detect transmitted packet collisions, and thus uses a collision avoidance protocol to lower the probability of packets colliding. Among other characteristics of this protocol, packet transmissions are spread out, with long intervals provided between packets. One result of long intervals between packets is that the amount of capacity used to send a packet is more than simply the size of the packet. Moreover, since packet sizes vary and the intervals are not dependent on packet size, there is no simple ratio between packet size and the amount of capacity consumed, and thus packet sizes influence the effective capacity.

Further, a wireless protocol dynamically adjusts the transmission rate based on the current signal quality, which is measured, and thus the capacity varies based on current radio frequency (RF) noise. More particularly, when significant RF noise is present, the length of time that each bit is transmitted is increased (e.g., doubled) to facilitate reception, which slows the rate. Conversely, the bit transmission length may be decreased as signal quality improves, which increases the rate up to some maximum.

In summary, at least some (e.g., price-based) schemes avoid or reduce network congestion operate by controlling (e.g., throttling back) output transmissions based on a current amount of congestion, which depends on the current capacity of the transmission link. However, when the capacity is variable, an accurate measure of the current capacity and network load is needed for such schemes to properly operate.

SUMMARY OF THE INVENTION

Briefly, the present invention provides a method and system for measuring the channel load and capacity in variable channel capacity networks. The method and system may adjust for or be selected as appropriate for certain types of variable bandwidth shared media networks, for various types of hardware, and other factors.

In one implementation, which is appropriate for certain types of variable bandwidth shared media networks, each system is enhanced by the addition of a component which records the accurate local time at which packets are handed to the network for transmission, and the time at which transmission is completed. From the distribution of the interval between these two times, the loading and effective channel capacity on the network is calculated, such as by comparing the measured time with a nominal time for transmission, e.g., the amount of time transmission takes in the absence of channel-capacity varying factors. By regularly sampling packets, dynamic channel capacity and network load data may be regularly provided to mechanisms that control network congestion.

In an alternative implementation, also for certain types of shared media networks, each machine records the size and time at which packets are requested to be sent, and the size and time at which packets arrive. Periodic time-stamped broadcast packets (e.g., from a consistent time keeper), allow these packets to be grouped and matched, which in turn allows the behavior, capacity and loading of the network channel to be determined.

In another alternative implementation, for certain types of point-to-point links with variable (data-dependent) compression, each machine records the size and time at which packets are handed to the network for transmission, and the time at which transmission is completed. This allows both the loading of the underlying link, and the achievable compression ratio to be calculated.

Other objects and advantages will become apparent from the following detailed description when taken in conjunction with the drawings, in which:

DETAILED DESCRIPTION

Exemplary Operating Environment

Figure 1:
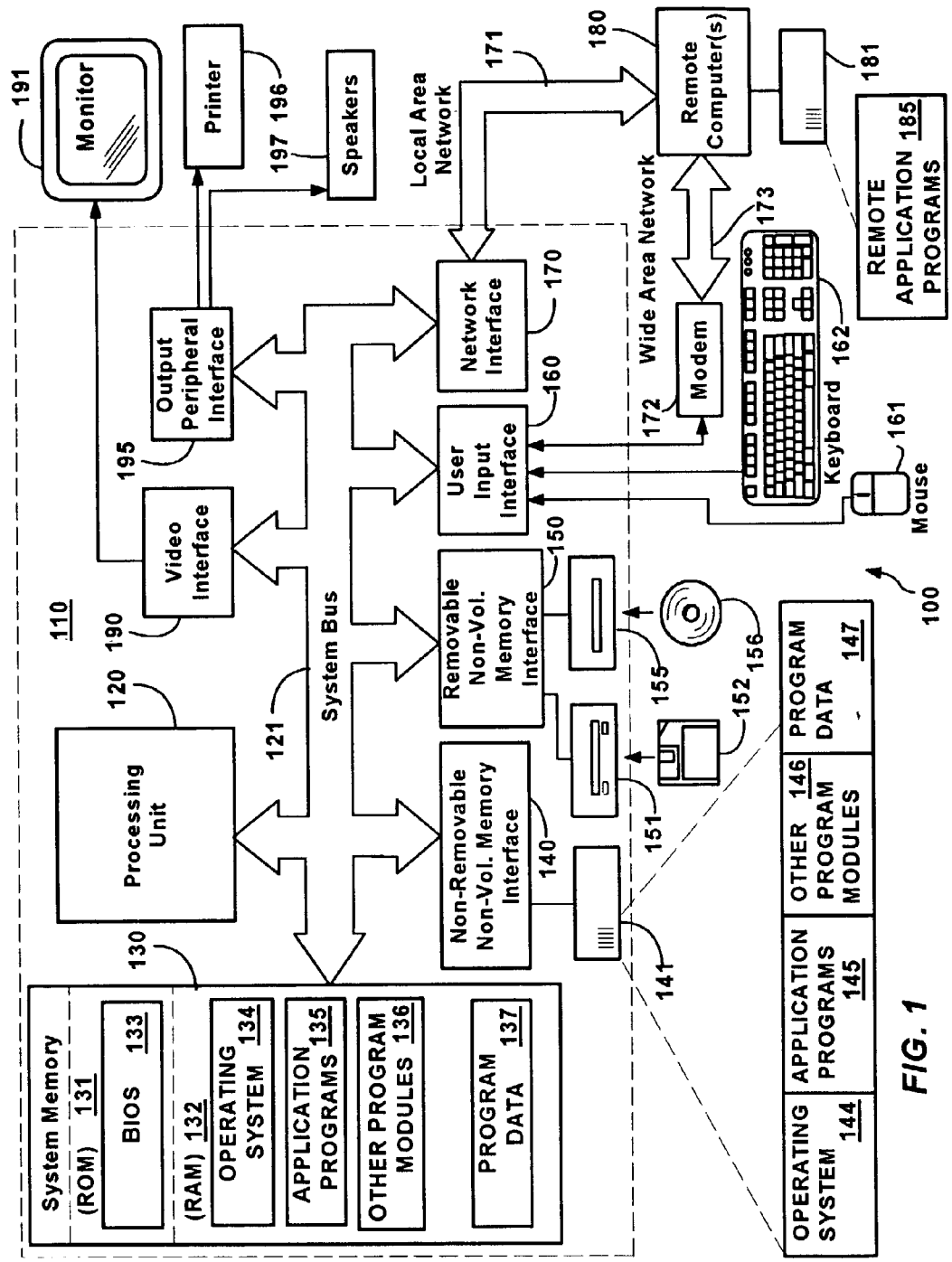
FIG. 1 is a block diagram representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface (e.g., hard disk controller) 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Measuring Load on a Variable Capacity Channel

Figure 2:
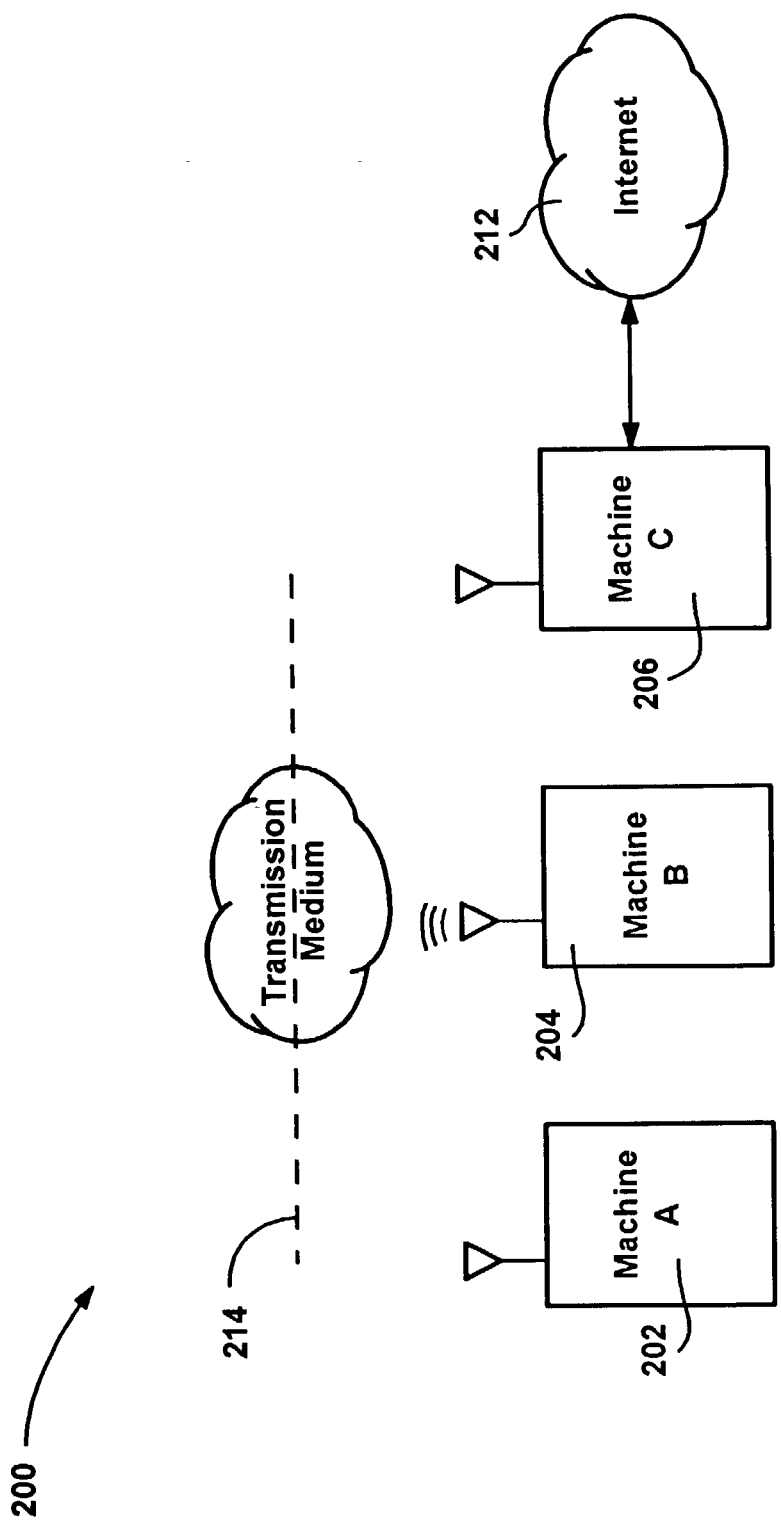
FIG. 2 is a block diagram generally representing an example variable capacity network into which the present invention may be incorporated.

FIG. 2 illustrates an example environment in which one aspect of the present invention may be implemented. In FIG. 2, a network 200 is represented, with a number of machines 202, 204 and 206 connected together by some transmission medium, although as is understood, more than three such computers may be networked together. Also, at least one of the machines (e.g., 202, 204, or 206) may have a (wired or wireless) connection 210 to the Internet 212. Note that the network 200 in FIG. 2 is shown as being a wireless network, which communicates data over a transmission channel 214 in the transmission medium (e.g., an RF link, represented as a dashed line), although as will be understood, the present invention is capable of providing benefits in wired or wireless networks, or some combination of both.

The present invention is not limited to any particular type of network, but is advantageous in one type of network having certain characteristics, including that the network is a shared media network, in which the utilization of the network channel 214 by one of the computers (e.g., the computer 204) prevents the simultaneous use of the network by another attached computer (e.g., the computer 206). This is generally represented in FIG. 2, wherein only Machine B 204 is represented as actually transmitting.

Another characteristic of this type of network 200 is that the network does not permit or support having an attached computer receive all the packets which are sent on the network, irrespective of the packets' destinations, (sometimes referred to as promiscuous mode). Determining the network behavior from full packet capture is thus not possible in this network; note that if full packet capture was available, and no other aspects of varying channel capacity were present, the techniques described in the aforementioned U.S. patent application Ser. No. 10/010,881 would generally suffice. Further, note that lack of promiscuous mode support is only one reason why understanding the network behavior from full packet capture is not possible, e.g., other reasons include the well-known hidden node problem, (where two transmitters cannot detect each other although other receivers can communicate with both of them) and/or the use of different SSIDs (Service Set Identifiers) or WEP (Wired Equivalent Privacy) keys.

Still another network characteristic is that the network 200 includes a Media Access Control (MAC) protocol, whose purpose is to provide approximately (e.g. probabilistically) fair usage of the network channel 214 by computers wishing to transmit a packet at any point in time, which, for example may be accomplished through the use of contention and exponential back-off. Yet another characteristic of the network 200 of FIG. 2 is that the network's capacity is effectively variable, due to the operation of the Media Access Control protocol, a difference in underlying encoding rate, a link-level retransmission mechanism invisible to the computer software, and/or other reasons. One commonly deployed example of a network having these characteristics is one arranged according to the IEEE standard 802.11, colloquially known as "Wireless Ethernet."

In general, on such a network 200, when a computer attempts to transmit a packet, the total transmit time of the packet will be comprised of the time to gain access to the medium, which may include waiting for the packets of other computers (which may vary in size) to be transmitted first, followed by the random back-off time of the collision avoidance MAC, followed by a serialization delay time to transmit in sequence each of the symbols comprising the packet. Together these times reflect the variable nature of the rate at which packets can be carried on the channel, due at least in part to the MAC protocol and the encoding rate.

In accordance with one aspect of the present invention, by measuring the actual time to transmit a packet, and repeating the measuring on other packets such that enough measurements are available to apply statistical techniques thereto, e.g., to average out the probabilistic behavior of the MAC protocol, then the loading on the network and the current amount of the variable channel capacity of the channel 214 are both determinable. For example, the nominal time to transmit a packet of a given size in the absence of varying factors such as noise and congestion is known from the maximum transmission rate, (e.g., corresponding to 11 Mbs for wireless Ethernet), or can be measured in other ways, and thus the actual channel capacity and load is easily determined from the actual time for the sampled packets.

To obtain the samples, one computer machine (e.g., the machine B 204) may be selected, nominated or elected to obtain a sufficient quantity of timed packet samples in order to perform the statistical analysis. Note that not every packet need be sampled, e.g., if the sampling is burdening the system. Such a computer is preferably one that makes regular use of the channel 214, such as a server computer, a wired access point for a wireless network, or a gateway or router between this network channel and other networks. Note that conversely, if none of the computers are making active use of the network, then the network loading is low and there is no network congestion to reduce, whereby knowledge of the load and varying capacity are not needed for this purpose, i.e., throttling to reduce network congestion.

Figure 3:
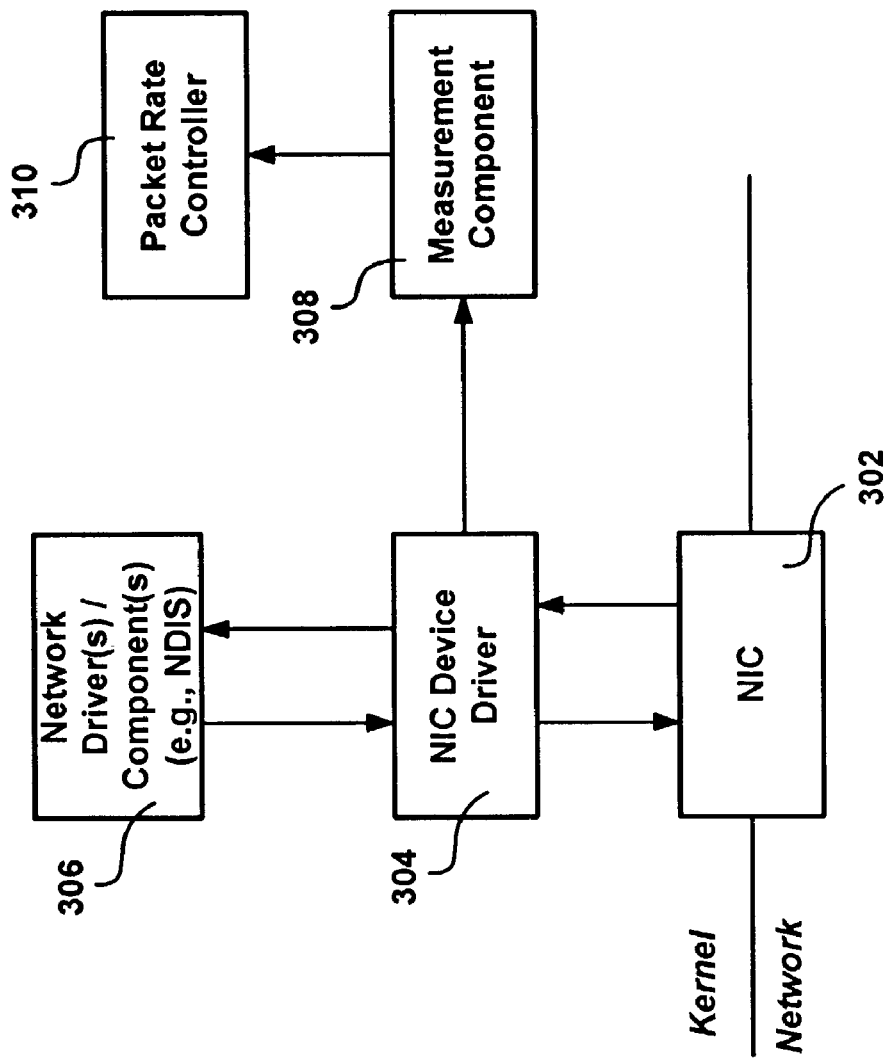
FIG. 3 is a block diagram generally representing example components in a computer system constructed to directly obtain packet transmission data, in accordance with one aspect of the present invention.

In keeping with the present invention, various alternative ways to perform the time measurements may be employed. One such way is represented in FIG. 3, where the network interface card (NIC) 302 (which may correspond to the network interface/adapter 170 of FIG. 1) has a device driver 304 that is aware of network capacity and load measurement, and cooperates in the measurement. In such an implementation, a higher-level networking component 306 hands a packet of a known size to the device driver 304 for transmission, and the device driver 304 records (or outputs) the time at which the packet transmission is requested of the NIC hardware device 302. The device driver 304 similarly records (or outputs) the time at which the NIC hardware device 302 confirms the transmission, e.g., via an interrupt. Such a device driver 304 may provide the raw time intervals to a measurement component 308 of the system which performs statistical averaging or the like to obtain smoothed, computed values of load and capacity. Alternatively, the device driver may perform some or all of the calculations internally, such as to output the interval, or periodically output the load and capacity data directly, e.g., some or all of the functionality of the measurement component 308 may be incorporated into the device driver 304.

In any event, the actual time to transmit a packet is measured by timing data provided from the device driver 304 (or by the device driver 304 itself), the times for a number of packets are statistically combined, and the load and capacity computed therefrom. A detailed explanation of how these accurate timestamps are recorded and how they are processed to determine the effects of the channel on packet latency is described in U.S. patent application Ser. No. 09/537,995, assigned to the assignee of the present invention and hereby incorporated by reference herein. The capacity and load data may be directly derived from the packet latency statistics and thence used by a packet rate controller 310 or the like, such as to throttle back transmission based on some criteria (e.g., "willingness-to-pay") to avoid network congestion, as described in the aforementioned U.S. patent application Ser. No. 10/010,881.

Note that if the device driver 304 is not itself cooperative, it is feasible to develop code (a lower-level driver) for insertion between the NIC driver 304 and the NIC 302 and thereby emulate a cooperative driver (not separately shown in FIG. 3). However, as can be readily appreciated, device driver code is often proprietary and carefully tested with the hardware device, and thus to protect the device, any such driver inserted between a hardware driver and its hardware would need to be carefully designed so as to not alter the device driver operation, e.g., to perform only limited functionality such as note and output the time that a packet, and the later confirmation of its transmission, is being passed through.

Figure 4:
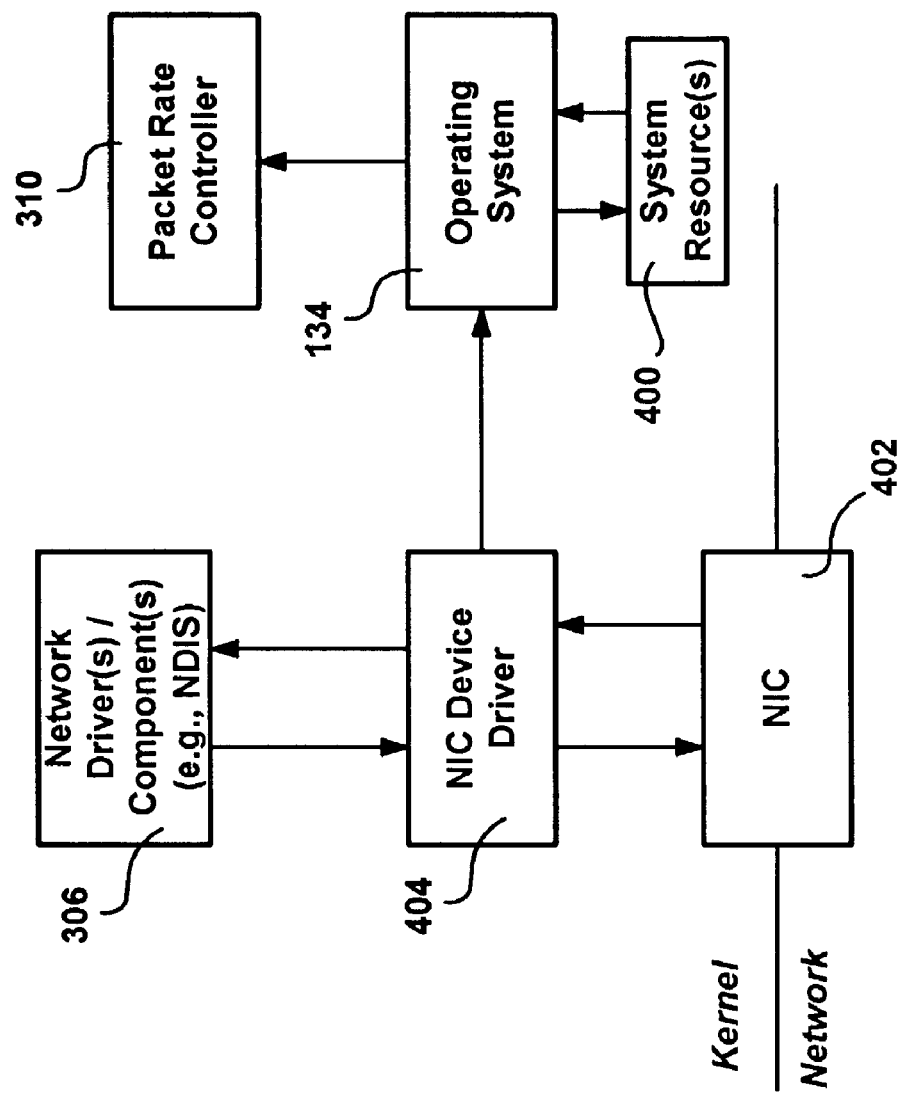
FIG. 4 is a block diagram generally representing alternative example components in a computer system constructed to indirectly obtain packet transmission data from requests directed to system resources, in accordance with one aspect of the present invention.

In accordance with another aspect of the present invention, when operating without an aware device driver that is capable of providing at least the timing information, an alternative technique may be employed to measure the time interval. In general, this alternative measurement technique is based on detecting, such as in the operating system 134, the packet's consumption of some form of system resource 400 (FIG. 4) that is tied to the packet's successful transmission. FIG. 4 shows one arrangement of software components which may be used to determine actual transmit times when operating a NIC 402 within a computer system having such an "unaware" device driver 404.

For example, a packet may consume some memory resources that are freed by the device driver 404 via the operating system 134 when the device driver 404 is finished with the memory resources. As long as the device driver 404 is one that is consistent in its allocation and freeing of the memory resources for packets, the operating system 134 can deduce the packet's start and confirmation times based on the memory requests from the device driver 404. Note that many such samples are taken of these intervals, and statistically interpreted, (e.g., with bad measurements discarded), so that even if a driver occasionally does not consistently request and/or free the resource, the valid start and confirmation times will provide valid results.

As another example of resource usage, for each packet, a device driver 404 may be given a reference count (or have an existing one increased), or be given a handle to memory in which the packet is placed. The reference count is then decreased, or the handle handed back, when transmission is complete. Again, assuming a consistent, properly-written device driver 404, the operating system 134 can deduce the packet's start and confirmation times based on the reference count-based requests or handle-based requests from the device driver 404.

In another example, the device driver 404 may request of the operating system 134 that an area of memory be made available for DMA or I/O access, and likewise the device driver 404 will indicate to the operating system 134 when such accesses have finished. Again, these requests may be used to determine the timing interval for each packet transmitted.

Another example resource whose usage may be detected in the operating system 134 is a thread, e.g., the device driver 404 may transmit the packet synchronously within the thread of control that requests the driver 404 to send the packet. In such an instance, the driver 404 will return control to the caller (i.e., the stack or thread resource) when the packet has been confirmed as having been transmitted, and thus the difference between the thread request and return of control may be used to determine the interval.

Figure 5:
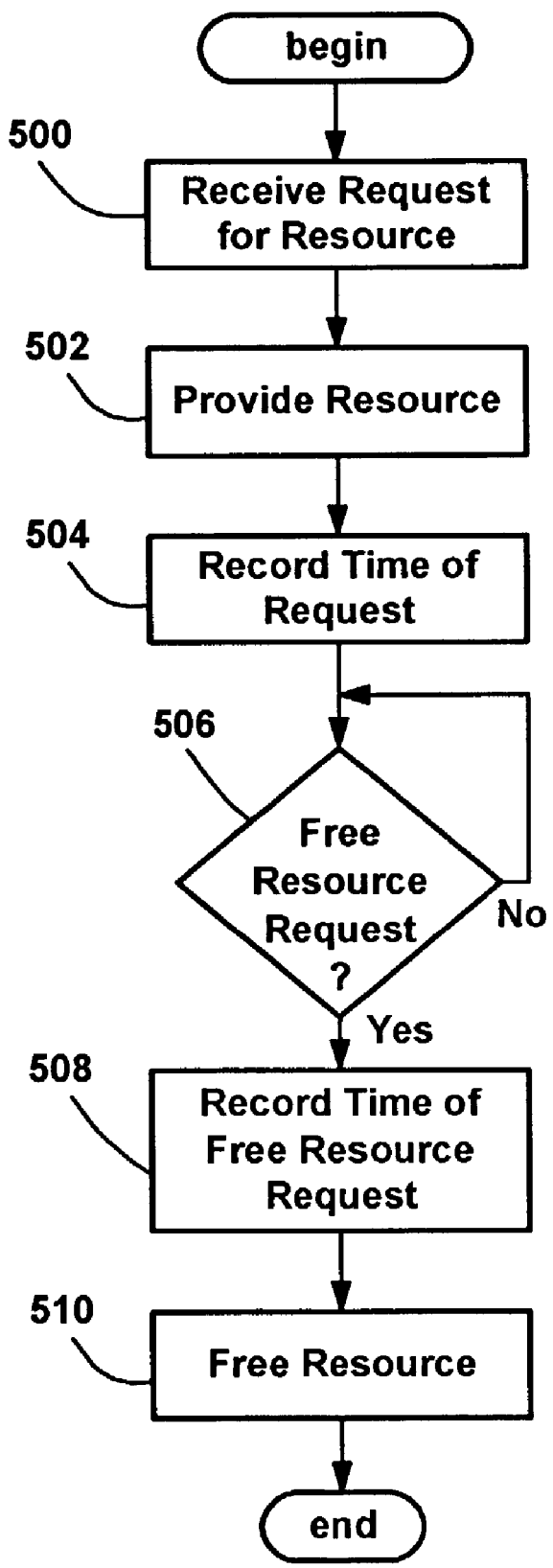
FIG. 5 is a flow diagram representing general logic for indirectly obtaining packet transmission data from requests directed to system resources, in accordance with one aspect of the present invention.

To summarize, in each of the above-described situations, a device driver 404 acquires a system resource 400 in order to function, and releases the system resource 400 in order to avoid becoming a net sink of resources (something which properly written device drivers carefully avoid). As a result, the operating system 134 can record the time intervals between a time when the resource associated with the packet is acquired, and a time when released, and use these time intervals to calculate the time taken to transmit the packet on the channel. FIG. 5 generally shows the logic from the perspective of the operating system in steps 500-510. Note that step 506 is shown as a loop for simplicity, although of course the operating system will be performing other operations between the request for the resource and the request for its release. Also note that step 508 may not actually record the time of the free request, but may, for example, directly perform a calculation such as to calculate the interval and/or also adjust a running average.

While the above mechanisms have been successfully tested with many types of network cards, such mechanisms can fail to provide accurate results with a particular type of network card, namely one that has its own packet buffers, and returns a confirmation of packet transmission to the driver on buffering a packet instead of on actual transmission confirmation. As can be appreciated and as described below, with such a mechanism, the measurement technique described above with reference to FIGS. 4 and 5 would measure the capacity of the link to the NIC card's buffers, instead of measuring the capacity of the network channel.

Figure 6:
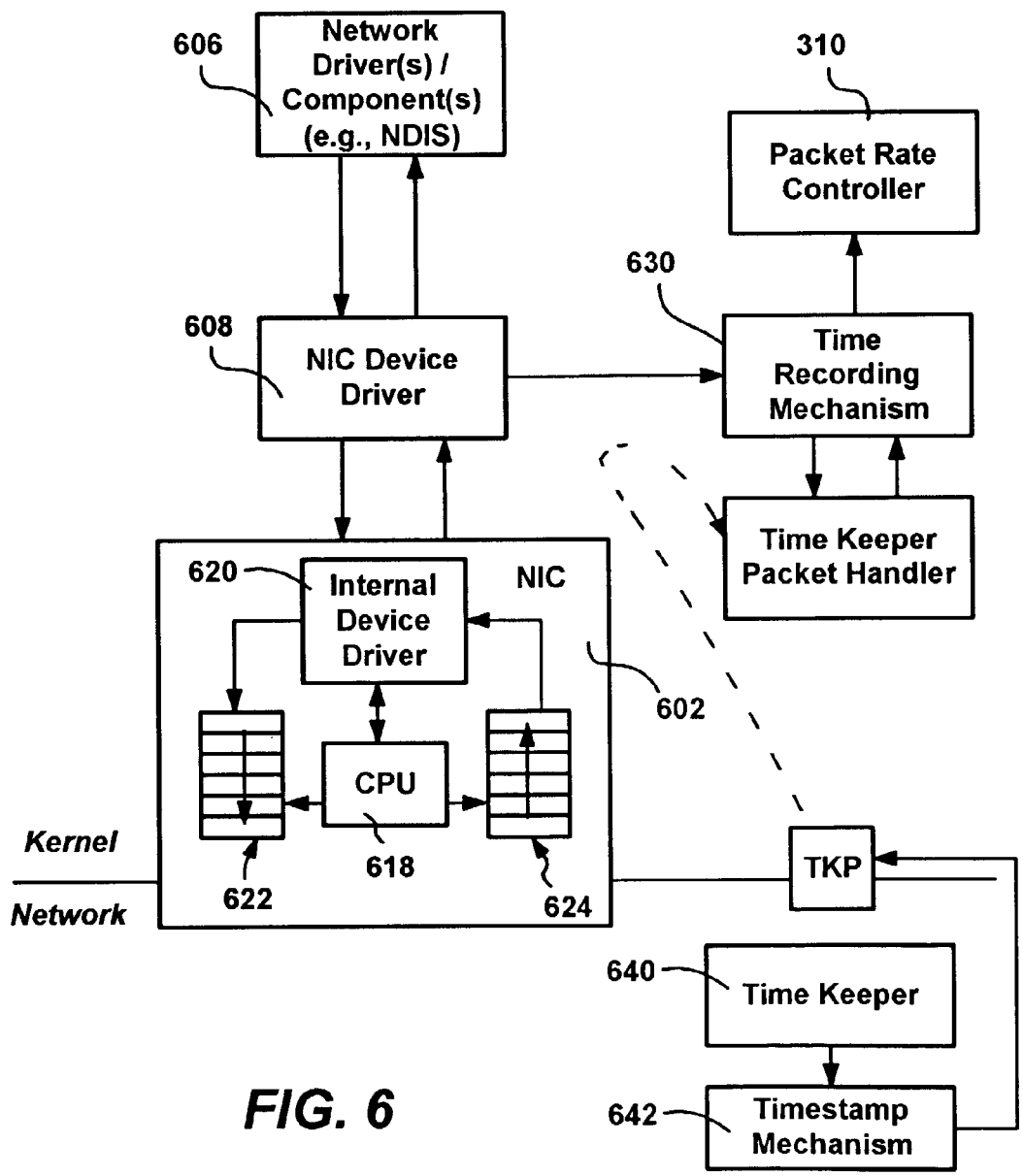
FIG. 6 is a block diagram generally representing alternative example components in a computer system constructed to actively time actual packet transmission, in accordance with one aspect of the present invention.

A general example of one such NIC card 602 is shown in FIG. 6, wherein, for example the NIC card 602 may be in one of the computer systems (e.g., the Machine A 202) connected to the network 200 of FIG. 2. In FIG. 6, the main processing agent in the computer system has no direct connection to the network, but is instead attached indirectly to the network through a network coprocessor or microcontroller (CPU) 618 or other autonomous buffer or buffering agent. Software code such as in the form of an internal device driver 620 provides transmission confirmation upon buffering a packet, and controls the CPU 620 to buffer outgoing packets for transmission and incoming packets for returning to the other components in respective outgoing and incoming buffers 622 and 624. In such a system, the internal device driver 620 may copy a packet to be transmitted unto the buffer memory on the hardware device 602 when transmission is requested, whereby the device driver 608 external to the NIC will finish using the system resources under the control of the operating system at the point the packet is buffered, which is likely before the time at which the packet is actually transmitted on the network. Consequently, neither direct measurement by the device driver 608 (as in FIG. 3), nor indirect measurement by monitoring the usage of operating system resources (as in FIGS. 4 or 5) will provide accurate time information. Note, that similar to the cooperative driver in FIG. 3, future such NIC cards may be made aware of the need to measure network capacity and load, and thereby be programmed to provide timing data on actual transmission in accordance with the present invention. At present, however, many cards that already exist commercially will not have such an awareness.

Figure 7:
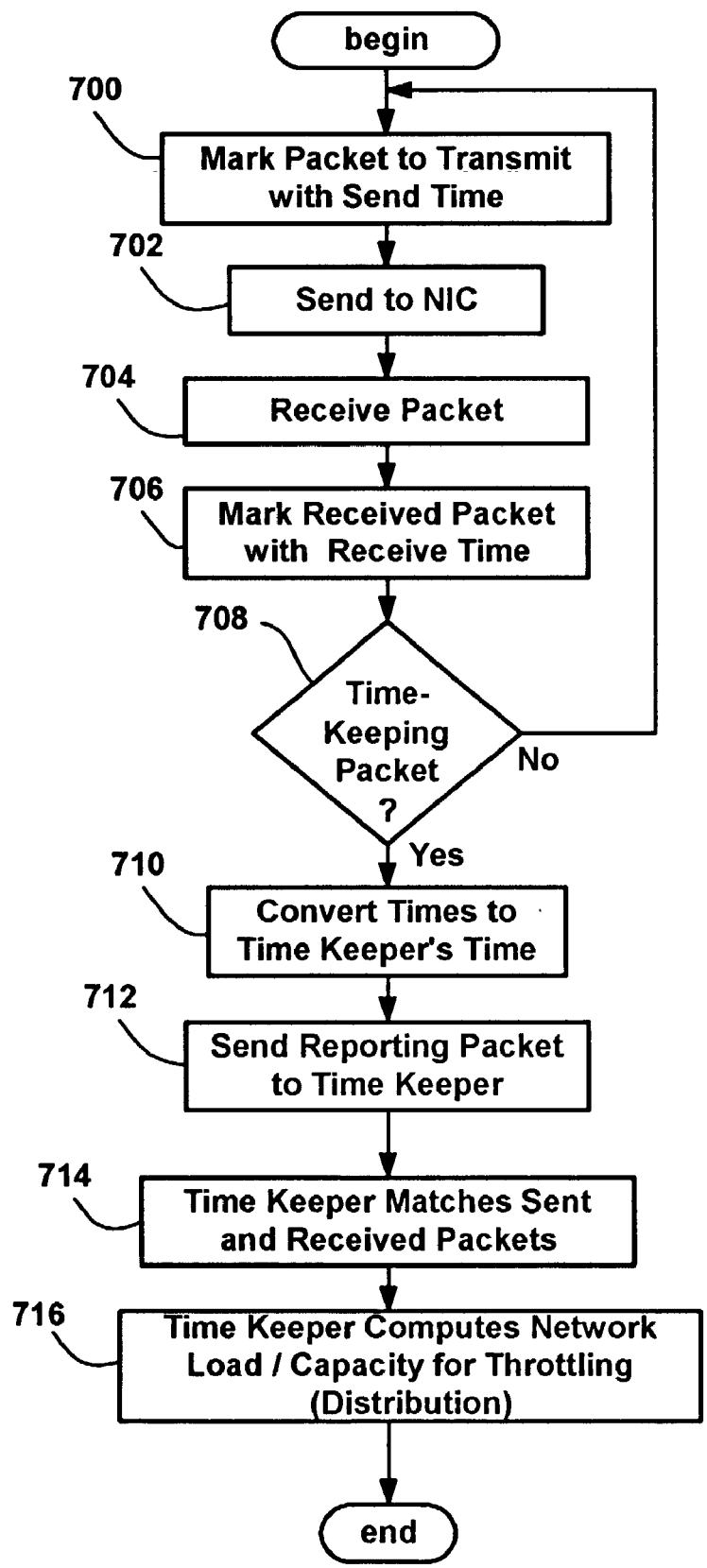
FIG. 7 is a flow diagram representing general logic for measuring load and capacity in network systems having network cards that buffer packets prior to transmission, in accordance with one aspect of the present invention.

In accordance with another aspect of the present invention, the load and variable capacity may be determined for a network device of the type represented in FIG. 6, e.g., having a microcontroller 618 with its own buffering memory 622 and 624 that operates in a semi-independent mode with respect to the device driver 608 for the network device. More particularly, as represented in FIG. 7, a network including one or more such devices may have its load and capacity measured by initially recording the times at which packets are passed to the network interface card 602 for transmission (steps 700 and 702). Suitable mechanisms for providing and/or recording the time may include one of those described above with reference to FIGS. 3-5, represented in FIG. 6 by the time recording mechanism 630. The time recording mechanism 630 also records the times at which packets arrive on the network interface card 624, as represented at steps 704 and 706 of FIG. 7. Note that steps 700-706 do not imply that one packet is received immediately following one being sent, but rather are only provided as an example to show the general operation.

To implement the measurement, one machine on the network is chosen or elected to act as a time-keeper 640, as represented in FIG. 6. The time keeper 640 is responsible for dividing the network activity up into periods or slots over which the loading and capacity will be determined. The explanatory text which follows describes these as distinct periods, but it can readily be appreciated that any system of sliding time overlapping periods is also sufficient provided the time keeper indicates the periods clearly. The time keeper 640 accomplishes this by occasionally sending a broadcast time-keeping packet (TKP in FIG. 6) on the network. Since broadcast packets are not retransmitted by the 802.11 link-layer, the time at which it is received on each of the network machines will be the same. The time keeper 640 writes its own local time into the packet immediately before sending it, and each machine records the time at which it was received. Time keeping packets also contain a sequence number which permits any packets dropped by a particular node to be determined (they are not retransmitted). A suitable time-stamp mechanism 642 for writing time and a sequence number into a packet is described in the aforementioned U.S. patent application Ser. No. 09/537,995.

Each computer node has the time keeper's time stamps within the time-keeping packet TKP, and the local time at which the time-keeping packet TKP arrived, and uses one or more algorithms (e.g., a generalized regression method such as a linear regression algorithm) on the time data in order to calculate the offset and drift (rate) between the node's local clock and the clock operating at the time-keeping node. In this manner, the offset and drift are compensated for on each node, i.e., the times that the packets were locally given to the hardware for transmission, and received from the hardware, are converted into the time of the time-keeping node using the calculated offset and drift, as also represented in step 710 of FIG. 7. Once again the aforementioned U.S. patent application Ser. No. 09/537,995 explains in detail how the various algorithms, procedures and techniques are utilized to manipulate the time records for the various packets.

As represented in step 712 of FIG. 7, for the current time slot, each computer node reports to the time keeper 640 the times at which packets were locally given to the hardware for transmission, and received from the hardware, on the node. Also, the sizes of each of these packets are reported with the packet data, in a collection of information referred to as the reporting packet.

On receipt of the reporting packets from each of the computers on the network for a time-slot period, the time keeper 640 ascertains which packet transmission on which node corresponds with the subsequent receipt of a packet on another network node on the network, as generally represented in step 714. Then, at step 716 the actual times are known and are used to compute the network capacity and load data, which in turn may be used for throttling to reduce network congestion. More particularly, by using the queuing time of packets at the nodes, the time to access the network, and the arrival of the packets, the time-keeper node deduces the network loading, the media access delays, and any data-link level retransmissions which occurred. Therefore the network load and the variable network capacity are known by the time-keeping node, which can be used directly or indirectly for throttling transmissions to reduce network congestion, depending on the system in place. Note that in some systems the network capacity and load data is needed at the nodes, whereby the network capacity and load data may be distributed to those other nodes, for example as an additional item in the next time-keeping packet.

Figure 8A:
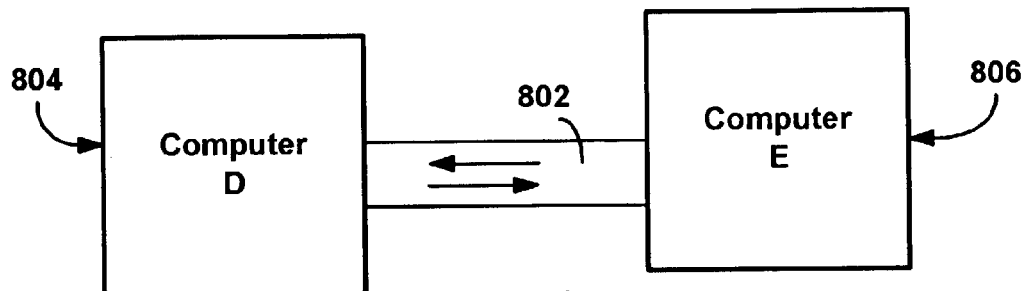
FIG. 8 is a block diagram generally representing alternative point-to-point networks having variable channel capacity resulting from dynamically adding and removing links and/or data compression, in accordance with one aspect of the present invention.
Figure 8B:
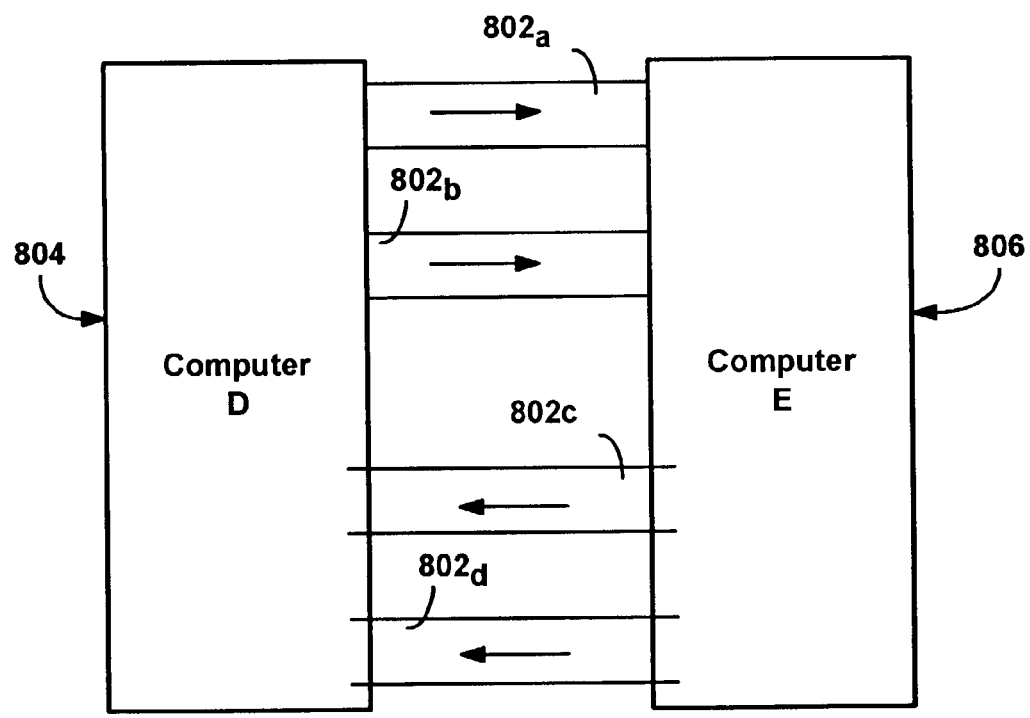

The present invention also provides benefits in other types of networks that have variable capacity, but that have different characteristics from those of wireless Ethernet networks. FIG. 8A represents a networked system in which the network is a point to point network, comprising a full-duplex channel 802 with one computer system 804, 806 at each end. The network is not a shared media network. The two directions of the full-duplex channel 802 may not operate at the same speed, and, as also represented in FIG. 8B, each direction of the channel may be comprised of several aggregated links $802_a$-$802_d$, in which the number of links may be varied dynamically by the channel, with or without the direct knowledge of the computer systems at the ends of the channel. In addition, either the channel, or the computer systems at the ends of the channel may engage in intra-packet or inter-packet compression techniques (such as van-Jacobson header compression). The PPP protocol over dial-up or ISDN is a commonly deployed example of a network with these characteristics.

In such a system, the variability of the channel comes from the packet compression and/or the number of links comprising the channel, which dynamically vary. In accordance with the present invention, a like system to that described with reference to FIGS. 6 and 7 is used to record the sizes and times of packets requested for transmission, and times of completion of transmission of packets. Since in the PPP environment, no other system is using each half of the channel, the loading and capacity can be directly calculated, i.e., the fraction of the time that the channel is not loaded equals the sum of the periods of time between the completion of transmission of one packet, and the time that the next packet is queued for transmission, over the total time. The capacity of the channel is calculated from the number of bytes transmitted in the packet, and the length of time between when the packet was queued and finished transmission.

In accordance with another aspect of the current invention, these calculations can be performed even in the event of multiple outstanding packets being queued for transmission by a network interface. To this end, the loading on the channel is determined by the time periods in which there are no queued packets for transmission. This can be readily determined, either by counting the occurrences of packets being queued, and their complete transmission being indicated, by a direct counter or by any other available means. The mean capacity of the channel is determined each time a complete packet transmission is indicated, either by dividing the time since the end of the last idle period of the channel into the sum of the packets transmitted since that time including the currently indicated packet, or by dividing the interval since the previous most recent packet transmission complete time (or the enqueuing time, whichever is later) into the size of the most recently completed packet. Indeed these two measurement results may be averaged, which may help to reduce some of the effects of scheduling or other sampling noise on the computer systems.

As can be seen from the foregoing detailed description, there is provided a method and system for measuring the channel capacity and load in a variable capacity network. The method and system are flexible depending on the types of computing components and networks available in given systems and networks.

While the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. In a computer network in which a plurality of computer machines such as end user computers, network servers, access points, gateways, routers and the like are networked together so that at least some of the computer machines communicate data packets over a common data transmission channel and wherein the transmission channel's capacity for transmitting data is variable due to factors such as packet encoding rate at the computer machines using the common data transmission channel, type of data compression used for packets, signal strength in the case of wireless transmission, or other factors, a method for determining current capacity and network load of the data transmission channel, comprising:

(1) selecting a particular one of the computer machines for obtaining a quantity of timed packet samples;
(2) for a data packet of known size, measuring at the selected computer machine a total transmit time for the data packet of known size, by performing at least one or the other of,
   (a) recording the time at which the data packet transmission is requested, then recording the time at which the transmission of the data packet is confirmed so as to determine the actual time interval required to transmit the data packet of known size, or
   (b) recording the time at which a system resource is requested for the data packet at the time transmission is requested, and then recording the time at which the system resource is released for the data packet at the time transmission of the data packet is confirmed so as to determine the actual time interval required to transmit the data packet of known size
(3) repeating step (2) for a sufficient number of other data packets so that enough measurements are available to apply statistical techniques to average out the probabilistic behavior of the transmission channel's variable capacity, thus obtaining a statistical measure of the transmission channel's current capacity and load;
(4) using a known nominal time to transmit a data packet of a given size for the data transmission channel, determining actual transmission channel capacity and load;
(5) comparing the transmission channel's current capacity and load and the actual transmission channel capacity and load in order to determine the degree of congestion on the transmission channel; and
(6) regulating data packet transmission over the data transmission channel based on the degree of congestion determined to be present.

2. In a computer network in which a plurality of computer machines such as end user computers, network servers, access points, gateways, routers and the like are networked together so that at least some of the computer machines communicate data packets over a common data transmission channel and wherein the transmission channel's capacity for transmitting data is variable due to factors such as packet encoding rate at the computer machines using the common data transmission channel, type of data compression used for packets, signal strength in the case of wireless transmission, or other factors, a computer program product comprising a computer-readable storage medium containing computer-executable instructions for implementing a method for determining current capacity and network load of the data transmission channel, the method comprising:

(1) selecting a particular one of the computer machines for obtaining a quantity of timed packet samples;
(2) for a data packet of known size, measuring at the selected computer machine a total transmit time for the data packet of known size, by performing at least one or the other of,
   (a) recording the time at which the data packet transmission is requested, then recording the time at which the transmission of the data packet is confirmed so as to determine the actual time interval required to transmit the data packet of known size, or
   (b) recording the time at which a system resource is requested for the data packet at the time transmission is requested, and then recording the time at which the system resource is released for the data packet at the time transmission of the data packet is confirmed so as to determine the actual time interval required to transmit the data packet of known size
(3) repeating step (2) for a sufficient number of other data packets so that enough measurements are available to apply statistical techniques to average out the probabilistic behavior of the transmission channel's variable capacity, thus obtaining a statistical measure of the transmission channel's current capacity and load;
(4) using a known nominal time to transmit a data packet of a given size for the data transmission channel, determining actual transmission channel capacity and load;
(5) comparing the transmission channel's current capacity and load and the actual transmission channel capacity and load in order to determine the degree of congestion on the transmission channel; and
(6) regulating data packet transmission over the data transmission channel based on the degree of congestion determined to be present.

3. The method of claims 1 or 2 wherein a media access control protocol controls network communication, and wherein the comparison performed at (5) indicates the mean behavior of the media access control protocol.

4. The method of claims 1 or 2 wherein measuring the transmit time measured at the selected computer machine comprises receiving data from a device driver.

5. The method of claims 1 or 2 wherein recording the time at which a system resource is requested comprises detecting at an additional operating system component at least one request from a device driver related to the system resource.

6. The method of claim 5 wherein detecting at least one request related to a system resource comprises detecting a request related to memory.

7. The method of claim 5 wherein detecting at least one request related to a system resource comprises detecting a request related to a handle.

8. The method of claim 5 wherein detecting at least one request related to a system resource comprises detecting a request related to a reference count.

9. The method of claim 5 wherein detecting at least one request related to a system resource comprises detecting a request related to a thread.

* * * * *